(12) United States Patent
Camacho Cardenas (10) Patent No.: US 10,669,783 B2
(45) Date of Patent: Jun. 2, 2020

(54) SYSTEM AND METHOD FOR NOISE, VIBRATION, AND LIGHT POLLUTION MANAGEMENT ON RIG SYSTEMS

(71) Applicant: Schlumberger Technology Corporation, Sugar Land, TX (US)

(72) Inventor: Alejandro Camacho Cardenas, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 113 days.

(21) Appl. No.: 15/701,675

(22) Filed: Sep. 12, 2017

(65) Prior Publication Data

US 2019/0078394 A1   Mar. 14, 2019

(51) Int. Cl.

| | |
|---|---|
| *E21B 41/00* | (2006.01) |
| *E21B 15/00* | (2006.01) |
| *G01H 11/00* | (2006.01) |
| *G10K 11/00* | (2006.01) |
| *F21V 7/00* | (2006.01) |
| *G10K 11/178* | (2006.01) |
| *H05B 47/10* | (2020.01) |

(52) U.S. Cl.
CPC .............. *E21B 15/00* (2013.01); *E21B 41/00* (2013.01); *F21V 7/0016* (2013.01); *G01H 11/00* (2013.01); *G10K 11/002* (2013.01); *G10K 11/17857* (2018.01); *G10K 11/17881* (2018.01); *H05B 47/10* (2020.01); *G10K 11/17861* (2018.01); *G10K 2210/121* (2013.01); *G10K 2210/129* (2013.01); *G10K 2210/1291* (2013.01); *G10K 2210/3216* (2013.01); *G10K 2210/3226* (2013.01)

(58) Field of Classification Search
CPC ......... E21B 15/00; E21B 41/00; H05B 37/02; F21V 7/0016; G10K 11/002; G10K 2210/129; G10K 2210/3216; G10K 2210/3226

See application file for complete search history.

(56) References Cited

U.S. PATENT DOCUMENTS

| | | | |
|---|---|---|---|
| 2007/0003071 A1* | 1/2007 | Slapak | G10K 11/178 381/71.1 |
| 2012/0205190 A1* | 8/2012 | Luoma | E21B 7/025 181/208 |
| 2018/0072391 A1* | 3/2018 | Dykstra | E21B 15/02 |

FOREIGN PATENT DOCUMENTS

| | | |
|---|---|---|
| EP | 2458090 A2 | 5/2012 |
| JP | 2000-068077 A | 3/2000 |
| WO | 2017123237 A1 | 7/2017 |
| WO | 2017127848 A1 | 7/2017 |

* cited by examiner

*Primary Examiner* — Brad Harcourt
(74) *Attorney, Agent, or Firm* — Rachel E. Greene (57) ABSTRACT

A system including a rig site with at least one pollution control system located on the rig site. The pollution control system is configured to modify an output of light, noise, or vibrations from the rig site to an environment surrounding the rig site. Additionally, the pollution control system may include at least one active noise cancellation device, at least one active vibration cancellation device, and/or at least one active light control system to modify the light, noise, or vibrations.

8 Claims, 9 Drawing Sheets

SYSTEM AND METHOD FOR NOISE, VIBRATION, AND LIGHT POLLUTION MANAGEMENT ON RIG SYSTEMS

BACKGROUND

Drilling rig systems are deployed worldwide, and sometimes the drilling rig systems are deployed in environmentally sensitive locations. Generally, drilling rigs are concerned with potential pollutants that include i) effluent water that can be contaminated with oily substances, ii) formation waters that are produced alone with crude oil and iii) gaseous emissions. Thus, steps are generally taken to minimize and/or treat effluents, drill waste, air pollution, etc.

SUMMARY OF DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, this disclosure relates to a system including a rig site and at least one pollution control system located on the rig site and configured to modify an output of light, noise, or vibrations from the rig site to an environment surrounding the rig site.

In one aspect, this disclosure relates to a method determining at least one of light, noise, or vibrations generated from a rig site and modifying an output of the light, noise, or vibrations from the rig site to an environment surrounding the rig site and/or within the rig site.

Other aspects and advantages will be apparent from the following description and the appended claims.

DETAILED DESCRIPTION

Embodiments of the present disclosure are described below in detail with reference to the accompanying figures. Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Further, embodiments disclosed herein are described with terms designating a rig site in reference to a land rig, but any terms designating rig type should not be deemed to limit the scope of the disclosure. For example, embodiments of the disclosure may be used on an offshore rig. It is to be further understood that the various embodiments described herein may be used in various rig sites, such as land rig, drilling vessel, offshore rig, etc., and in other environments, such as work-over rigs, fracking installation, well-testing installation, oil and gas production installation, without departing from the scope of the present disclosure. The embodiments are described merely as examples of useful applications, which are not limited to any specific details of the embodiments herein.

Many drilling rigs operate on environmentally sensitive areas, where various types of pollution may create concerns and limit rig deployment. For example, in some geographies, there may be a concern that a drill (which can operate on 24 hours a day) may disrupt wildlife, human health, recreation and other purposes of the environment. For example, there are concerns that biological systems are incredibly complex and can fall victim to serious ecological consequences when disturbed by drilling rig systems. Activities preformed during the drilling and development of an oil or gas well may include ground clearing and removal of vegetative cover, grading, drilling, waste management, vehicular and pedestrian traffic, and construction and installation of facilities. Activities conducted in locations other than at the oil and gas well pad site may include excavation/blasting for construction materials (sands, gravels), access road and storage area construction, and construction of gathering pipelines and compressor or pumping stations. Further, at the rig itself, there is may be ongoing noise, light and vibrations that exposed to the environment surrounding the rig, without an understanding for the potential impact of such factors on the environment.

Figure 1:
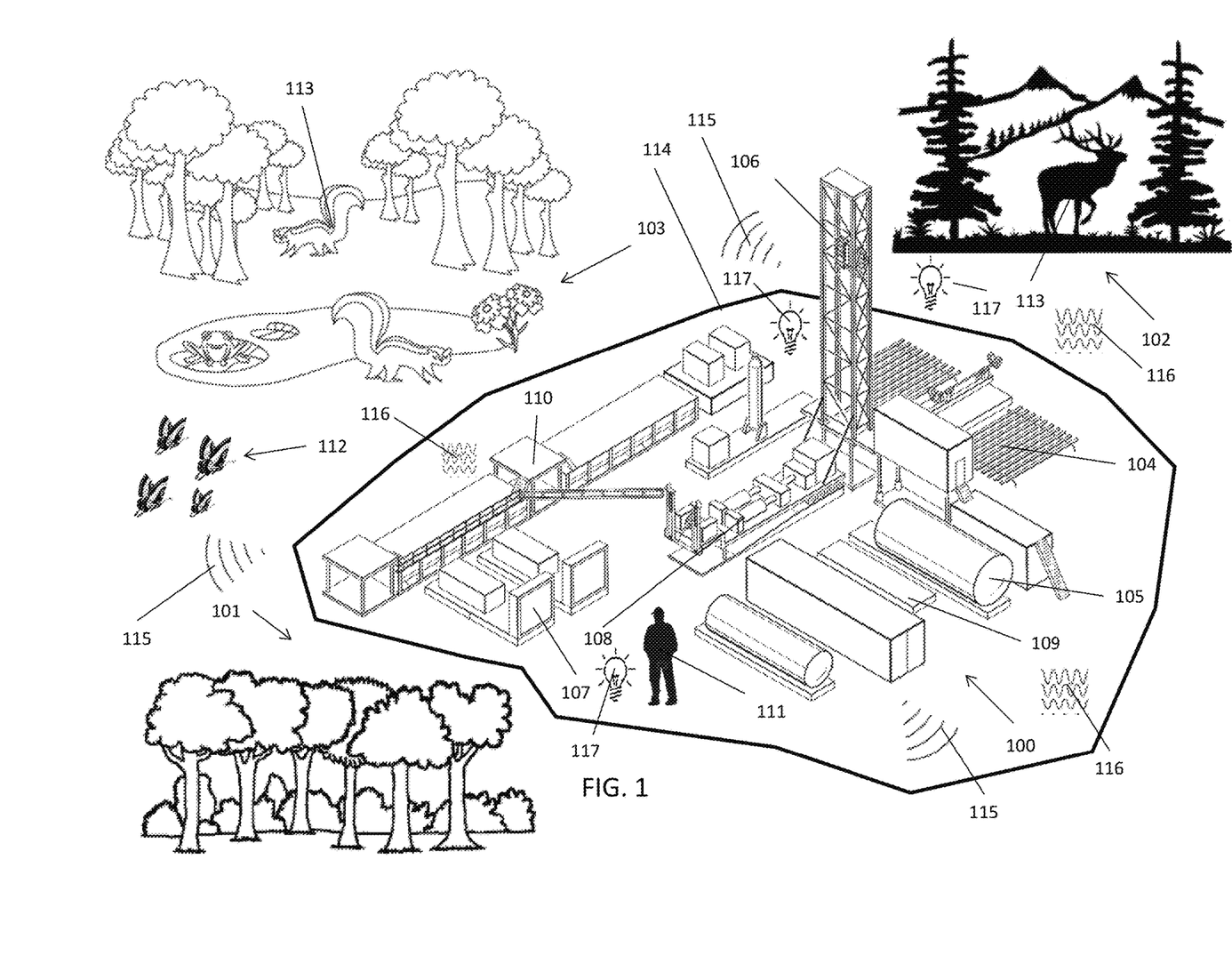
FIG. 1 illustrates a view of a drilling rig system.

As shown in FIG. 1, a drilling rig system 100 may in various environments. For example, the drill rig system 100 may be near a forest 101, mountain rages 102, water sources 103, or any environment. Additionally, the drilling rig system 100 includes a wide variety of rig equipment, which may generate various forms of pollution, such as noise 115, vibration 116, and light 117. For example, the wide variety of rig equipment may include tubulars 104, tanks 105, a rig derrick 106, mud pumps 107, well equipment 108, tool skids 109, mud skids 110, or any piece of equipment know in the art used at drilling rig systems 100. Additionally, the drilling rig system 100 may include a boundary 114 to separate the drilling rig system 100 from the various environments. The boundary 114 may be an invisible boundary or a physical boundary. As such, the drilling rig systems 100 may generate excessive and/or constant noises that have unknown (and possibly ill) effects on organisms. On humans 111, the threat of noise pollution 115 can cause a number of short and long-term health issues, such as reduced work performance, cardiovascular effects, sleep disturbances, hearing impairment and more. Even low-level noises can increase health risks and lower task motivation for individuals. With respect to the environment, noises 115 can have devastating short and long-term effects on wildlife 113, both marine and terrestrial. Additionally, sound may interfere with wildlife's 113 communication, reproduction, navigation and many other aspects of their behavior, potentially causing loss of habitat, confusion and death. Furthermore, drilling rig systems may generate vibration pollution 116. Vibrations 116 may have similar effects to noise 115 with the added aspect that vibration 116 can transmit through the ground and/or structures and affect life that uses vibration on as part of their survival strategy.

Drilling rig systems 100 may also generate light pollution 117. Light pollution 117 can have adverse effects on humans 111 such as increased headache incidence, worker fatigue, stress, decrease in sexual function, sleep disorders among many others. Many forms of wildlife 113 base their very survival on the existence of night/day cycles. By triggering unnatural light events, these organisms may be disrupted of their reproductive, communication, migration, feeding and many other life-cycles. Light pollution 117 can be directly correlated to species population reductions and can potentially accelerate extinction. In particular, many insects 112 find themselves attracted to light, making a drilling rig a possible insect trap.

Having a drilling rig with noise, vibration and light pollution control systems can bring a tremendous competitive advantage on rainforest, offshore and any other sensitive location. Embodiments of the present disclosure describe measurements, control systems and strategies to manage these types of pollution. For example, in one or more embodiments, noise and vibration management may use the principle of active noise cancellation to limit their propagation. Light management may include active controls and mechanisms to dynamically modify the light output of the rig into the environment.

Embodiments of the present disclosure may be directed to systems and methods to control, reduce and eliminate the amount of noise, vibration and light pollution a drilling rig system transmits to the environment. That is, when a drilling rig system generates at least one light, noise, and/or vibration, at least one pollution control system located on the rig site modifies an output of light, noise, or vibrations from the rig site to an environment surrounding the rig site. Thus, the light, noise, or vibrations generated from the drilling rig system is reduced or eliminated. It is further envisioned when multiple wells are drilled with multiple drilling rig systems, the pollution control system may be deployed in a large area or at each drilling rig system to cover the environment over large distances. With such process, the corresponding light, noise, or vibrations of all drilling rig systems are reduced or eliminated with one or more pollution control systems. In conventional operations, drilling rig systems simply use fences and security gates to restrict movement in and out from the drilling rig systems. Furthermore, drilling rig systems typically only require personal at the rig site to wear ear plugs. In contrast, embodiments of the present disclosure provide a pollution control system to reduce or eliminate light, noise, or vibrations of the drilling rig system with a more scientific approach, thus presenting significant safety improvements to the environment inside and outside the drilling rig systems, for example. As discussed herein, reducing, containing, controlling, redirecting, or eliminating the light, noise, or vibrations generated by the drilling rig system by a pollution control systems of a drilling rig system are all envisioned as being embodiments of the present disclosure.

Various embodiments that allow for pollution control systems to be used are envisioned and such embodiments may be used at any stage of the well in which the drilling rig system is being employed, moving, or no longer at the well. For example, the pollution control systems can be deployed during the initial rig-up of a rig, throughout the drilling operations, and/or on beam pump systems which are used at the completion of the well. Thus, the pollution control systems may be attached to either be temporally or permanently with or without the drilling rig. Additionally, the pollution control system may be adjusted to be accommodating to the drilling rig system during different stages of the well's life.

Further, embodiments disclosed herein are described with terms designating in reference to a noise, a vibration, or a light, but any terms designating should not be deemed to limit the scope of the disclosure. For example, the noise may include any type of sound waves and may have any decibel value (dB). Further, the vibrations are oscillations occurring about an equilibrium point, and thus studies of sound and vibration are closely related. For example, vibrating structures may generate sounds or pressure waves, and these pressure waves can also induce the vibration of structures. As such, one of ordinary skill would understand that attempts to reduce noise are often related to issues of vibration. It is to be further understood that the various embodiments described herein may be used with various types of light, including but not limited to any light on the light spectrum, without departing from the scope of the present disclosure. The light generally refers to visable light but may include different light colors and lights in a spectra outside of the human eye (e.g. UV light).

Figure 2A:
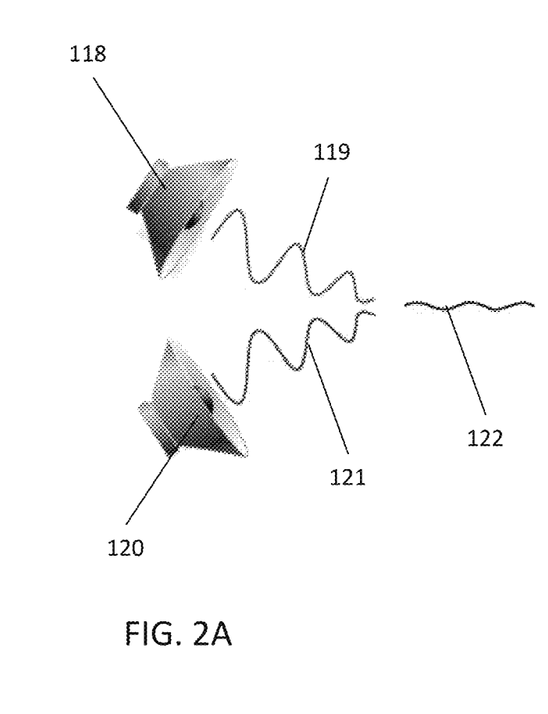
FIGS. 2A-2B illustrate principles of anti-noise and anti-vibration methods.
Figure 2B:
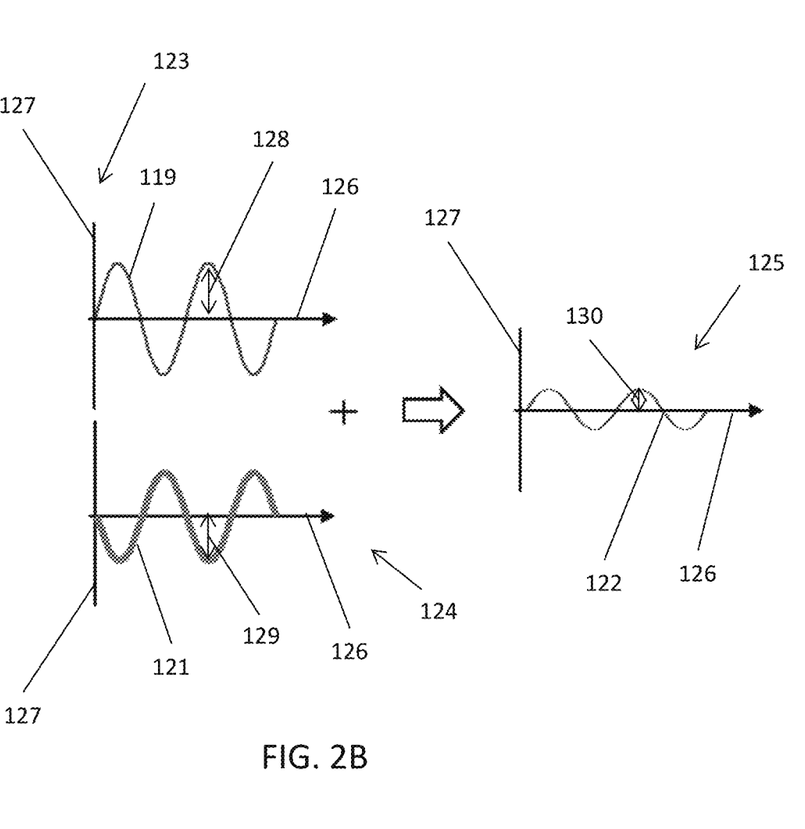

As shown in FIGS. 2A-2B, principles of active noise cancellation (ANC) and active vibration cancellation (AVC) methods are shown. While the figures may be described with respect to noise and noise cancellation, vibrations may manifest as waves and also benefit from the principle of ANC for management purposes. Thus, the same aspects shown in FIGS. 2A and 2B apply, with the difference being that instead of a sound source being controlled with anti-noise device, a vibration source will be controlled with anti-vibration device. FIG. 2A shows a source 118 that generates a first wave 119. The source 118 is shown as a speaker for simplicity purposes as the source 118 may be any object capable of generating a noise and/or vibration. The first wave 119 may be a sound wave or a vibration. In order to reduce or eliminate the first wave 119, an ANC device or AVC device 120 is provided. The ANC device or AVC device 120 generates a second wave 121 specifically designed to reduce or eliminate the first wave 119. The first wave 119 and the second wave 121 to form a resultant wave 122. Referring to FIG. 2B, the first wave 119, the second wave 121, and the resultant wave 122 are plotted on three separate X-Y graphs 123, 124, 125 to further show how the ANC and AVC principles are achieved. The graphs 123, 124, 125 represent time on an X-axis 126 and amplitude on a Y-axis 127. The first wave 119 has an amplitude value 128 that generates a noise. The second wave 121 emits approximate amplitude 129 to the amplitude value 128 but the second wave 121 is also emitted at an inverted phase to the first wave 119. Furthermore, the waves 119, 121 combine to form the resultant wave 122, in a process called interference, and effectively cancel each other out. Generally, the resultant wave 122 will have a final amplitude 130 lower than the amplitude value 128 or approximately equal to zero, and thus, the resultant wave 122 generates a noise that is lowered to have little to no impact on a surrounding environment.

Additionally, embodiments of the present disclosure may also be directed at the use of analog circuits or digital signal processing to aid the ANC or AVC devices. Adaptive algorithms are designed to analyze the waveform of the background aural or monaural noise or vibration. Based on information generated from the adaptive algorithms, the ANC or AVC devices will generate a signal that will either phase shift or invert the polarity of the original signal. The inverted signal (in anti-phase) is then amplified and a transducer creates a wave directly proportional to the amplitude of the original waveform, creating destructive interference to effectively reduce the volume of the noise or vibration. Furthermore, the ANC or AVC devices may be located near the noise or vibration source to be attenuated. In this case, the ANC or AVC devices may have the same power level as the source of the unwanted noise or vibration. Alternatively, the ANC or AVC devices emitting the cancellation signal may be located at the location where the noise or vibration attenuation is wanted (e.g. near personal or wildlife) and may have a lower power level than the source of the unwanted noise or vibration.

Now referring to FIGS. 3A-3D, in one or more embodiments, a pollution control system for drilling rig system 100 is shown. The drill rig system 100 may be near a forest 101, mountain rages 102, water sources 103, or any environment. Additionally, the drilling rig system 100 includes a wide variety of rig equipment, which generates a form of pollution, such as noise 115 and vibration 116. Furthermore, the drilling rig system 100 may generate light that will be discussed in later Figures. The wide variety of rig equipment may include tubulars 104, tanks 105, a rig derrick 106, mud pumps 107, well equipment 108, tool skids 109, mud skids 110, or any piece of equipment know in the art used at drilling rig systems 100. Additionally, the drilling rig system 100 may include a boundary 114 to separate the drilling rig system 100 from the various environments (e.g. forest 101, mountain rages 102, water sources 103, etc.). The boundary 114 may be an invisible boundary or a physical boundary. As mentioned above, the noises 115 and vibration 116 may have effects on humans 111, wildlife 113 and insects 112, as well as the environments 101, 102, 103. As such, in one or more embodiments, the drilling rig system 100 may use active noise cancellation (ANC) and/or active vibration cancellation (AVC) devices 131. It is further envisioned that the ANC and AVC devices 131 may be combined together or be separate devices for proposes of controlling noises 115 or vibrations 116. Hereinafter, the term ANC and AVC devices 131 will be used, but one of ordinary skill would understand there might only be the need to use either the ANC device or the AVC device and not both. Additionally, one skilled in the art will appreciate how drilling rig system 100 may use any number of ANC and AVC devices 131 that are needed to achieve the desired level of noise 115 or vibrations 116.

Furthermore, the drilling rig system 100 may include one or more sensors 132 or measurement devices disposed around the drilling rig system 100. The one or more sensors 132 may be used to measure and detect sound on any location of the drilling rig system 100 (including air and ground), as well as measure and detect sound outside the drilling rig system 100 both very close or even miles away. The one or more sensors 132 may be a microphone, ultrasonic, ultrasound, sound navigation and ranging (SONAR), radio detection and ranging (RADAR), acoustic, piezoelectric, accelerometers, or any known sensor in the art to detect noise and vibrations. It is further envisioned that the one or more sensors 132 may communicate wirelessly or through fiber optics to send the gather information to the ANC and AVC devices 131. Furthermore, the drilling rig system 100 may include a central network (not shown) that collects all the information transmitted from the one or more sensors 132 to manually or automatically use the ANC and AVC devices 131 at the desired amplitude.

Figure 3A:
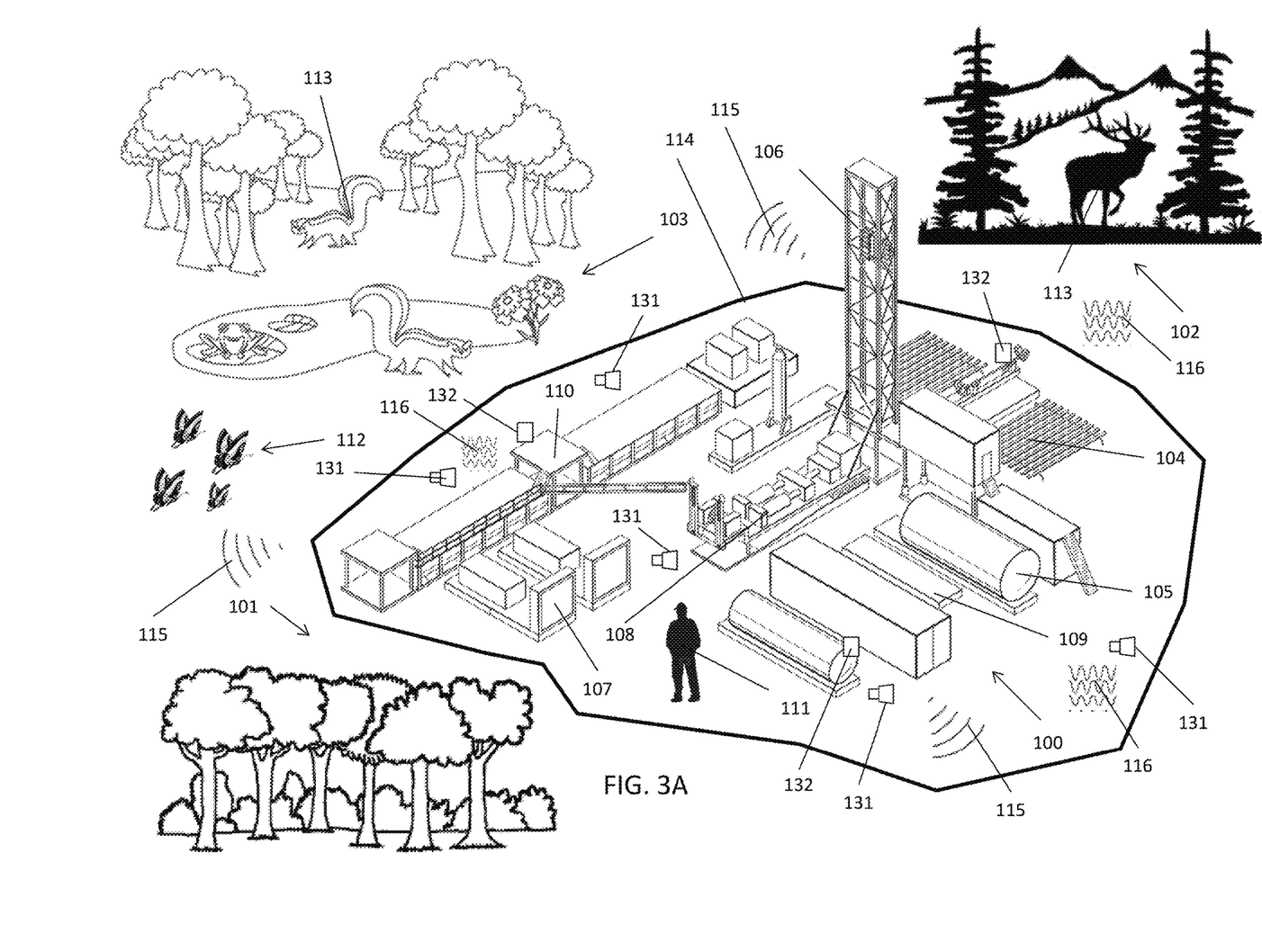
FIGS. 3A-3D illustrate a view of a pollution control system for a drilling rig system according to one or more embodiments of the present disclosure.

Referring to FIG. 3A, in one or more embodiments, the ANC and AVC devices 131 may be disposed within the boundary 114 of the drilling rig system 100. By placing the ANC and AVC devices 131 within the boundary 114, the ANC and AVC devices 131 are in a local position. In the local position, the ANC and AVC devices 131 are located on and/or next to the various equipment of the drilling rig system 100 (e.g. tubulars 104, tanks 105, a rig derrick 106, mud pumps 107, well equipment 108, tool skids 109, mud skids 110, etc.). Additionally, the ANC and AVC devices 131 may be located at areas where the personnel 111 are working (rig-floor, control rooms, platforms, etc.). Furthermore, the ANC and AVC devices 131 may be located at areas where noises 115 and vibrations 116 are present and ANC and AVC devices 131 may address efficiency, efficacy, safety, or cost concerns of the drilling rig system 100 by reducing and/or eliminating noise 115 and/or vibrations 116. One skilled in the art will appreciate how, at the local positions, the ANC and AVC devices 131 are able to generate a second wave in an inverted phase to directly interface with a first wave of the noises 115 and vibrations 116 generated from the drilling rig system 100. Thus, in one or more embodiments, the ANC and AVC devices 131 are reducing or eliminating the noises 115 and vibrations 116 directly at the source or directly adjacent to the source.

Figure 3B:
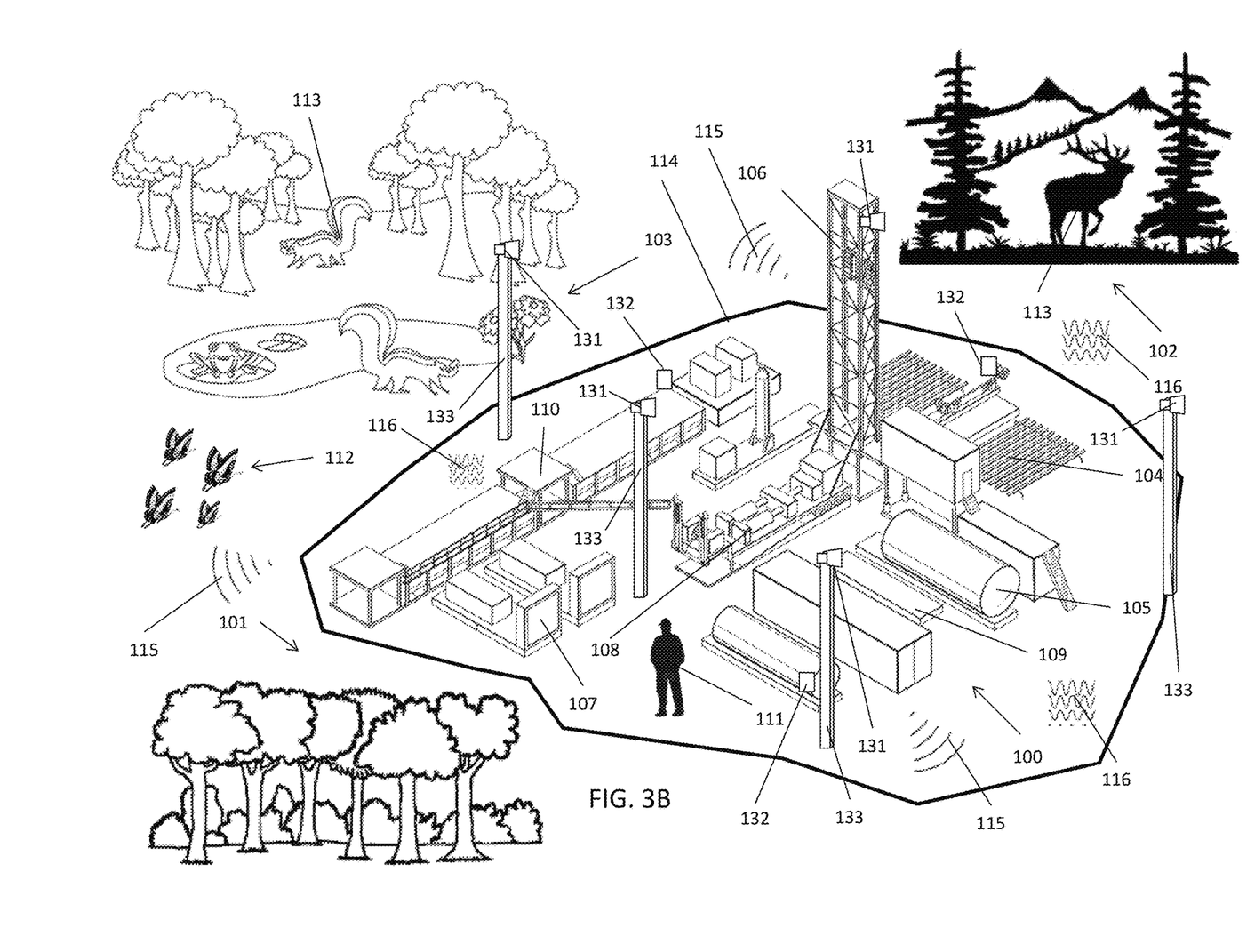

Referring to FIG. 3B, in one or more embodiments, the ANC and AVC devices 131 may be disposed at various elevations around the drilling rig system 100. The ANC and AVC devices 131 may be at ground level, above ground level or below ground level (i.e. 3-dimensional surrounding areas). For example, the ANC and AVC devices 131 may be mounted on poles 133 or on various equipment of varying height (e.g. mast 106) to cover air-level areas. Similarly, holes (not shown) may be created on around the drilling rig system 100 to mount the ANC and AVC devices 131 below the ground level. By placing the ANC and AVC devices 131 at various elevations, the ANC and AVC devices 131 may reduce or eliminate noises 115 and vibrations 116 being propagated at any elevation around the drilling rig system 100. It is further envisioned that the holes and poles 133 may be within the boundary 114, at the boundary 114, and outside the boundary 114 of the drilling rig system 100.

Figure 3C:
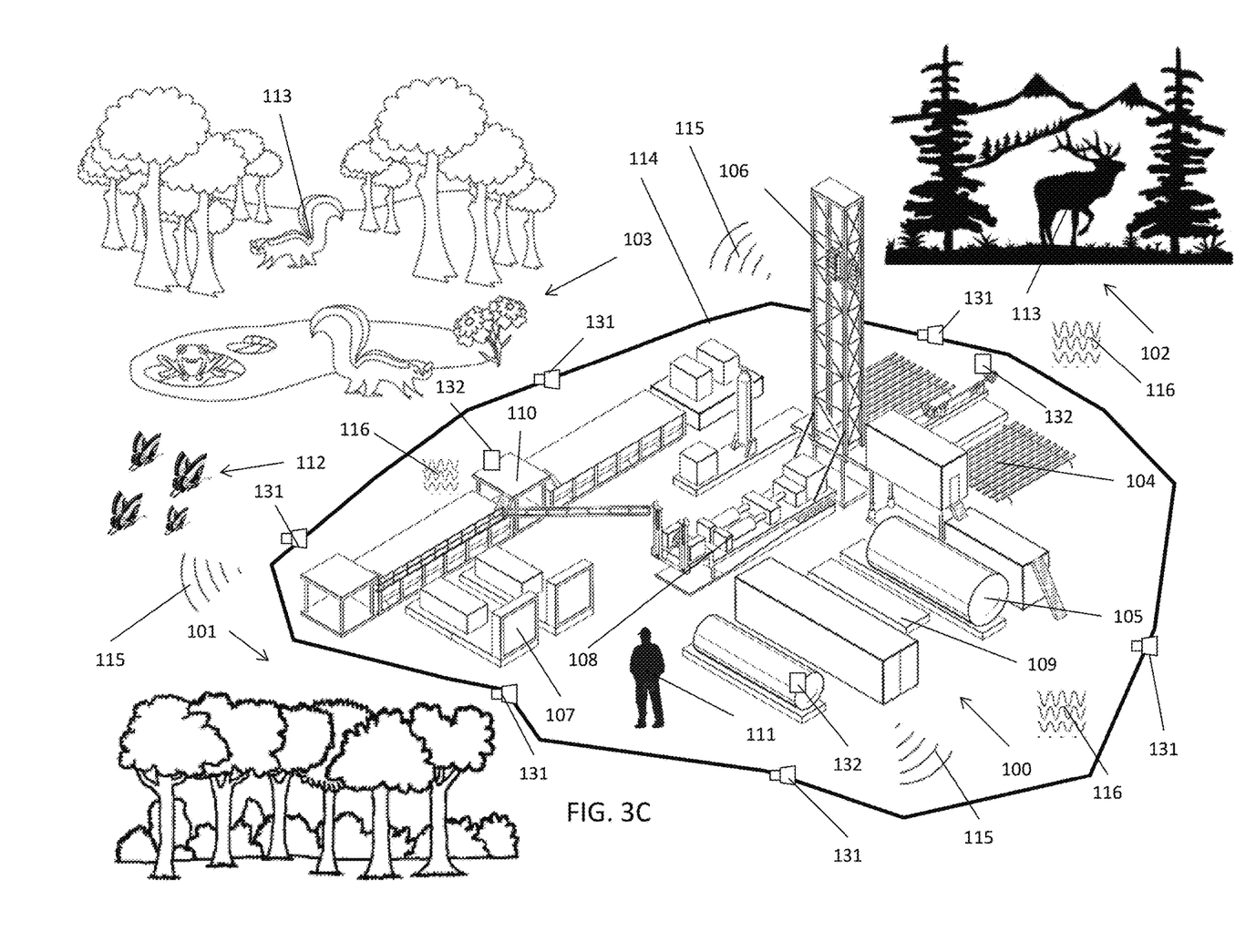
Figure 3D:
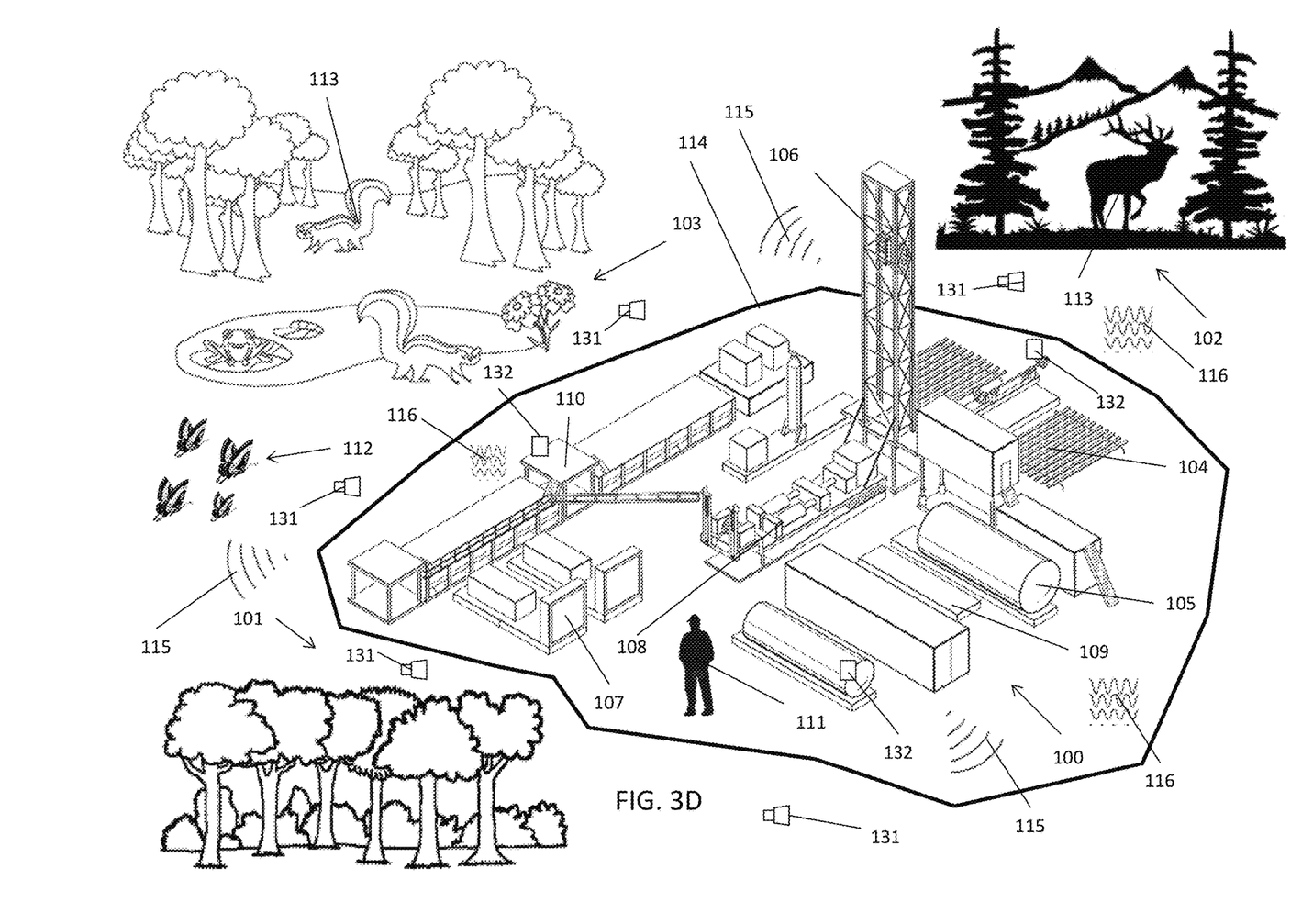

Referring to FIG. 3C, in one or more embodiments, the ANC and AVC devices 131 may be disposed at the boundary 114 of the drilling rig system 100. By placing the ANC and AVC devices 131 at the boundary 114, the ANC and AVC devices 131 are in a boundary position. In the boundary position, the ANC and AVC devices 131 may prevent noise 115 and vibration 116 from being propagated outside the drilling rig system 100 (e.g. beyond the boundary 114). It is further envisioned that at the boundary positions, the ANC and AVC devices 131 may also reduce or eliminate noises 115 and vibrations 116 entering the drilling rig system 100. Furthermore, one skilled in the art will appreciate how the ANC and AVC devices 131 may generate less or more power as the noises 115 and vibrations 116 generated from the drilling rig system 100 are typically further away from their source. With the noises 115 and vibrations 116 being further from the ANC and AVC devices 131, the ANC and AVC devices 131 may use less power to generate a second wave to reduce or eliminate the first wave of the noises 115 and vibrations 116 near the locations of the ANC and AVC devices 131. Inversely, the ANC and AVC devices 131 may generate more power to have the second wave travel a further distance and reduce or eliminate the first wave at the source of the noises 115 or vibrations 116. Additionally, as shown by FIG. 3D, the ANC and AVC devices 131 may be located outside the boundaries 114 of the drilling rig system 100, further preventing noises 115 and vibrations 116 from being propagated into the environments (e.g. forest 101, mountain rages 102, water sources 103, etc.). It is further envisioned that the ANC and AVC devices 131 may be used in multiple locations for the drilling rig system 100. For example, the ANC and AVC devices 131 may be in the local position, at various elevation, at the boundary position, outside the boundary, or any combination thereof.

Figure 4:
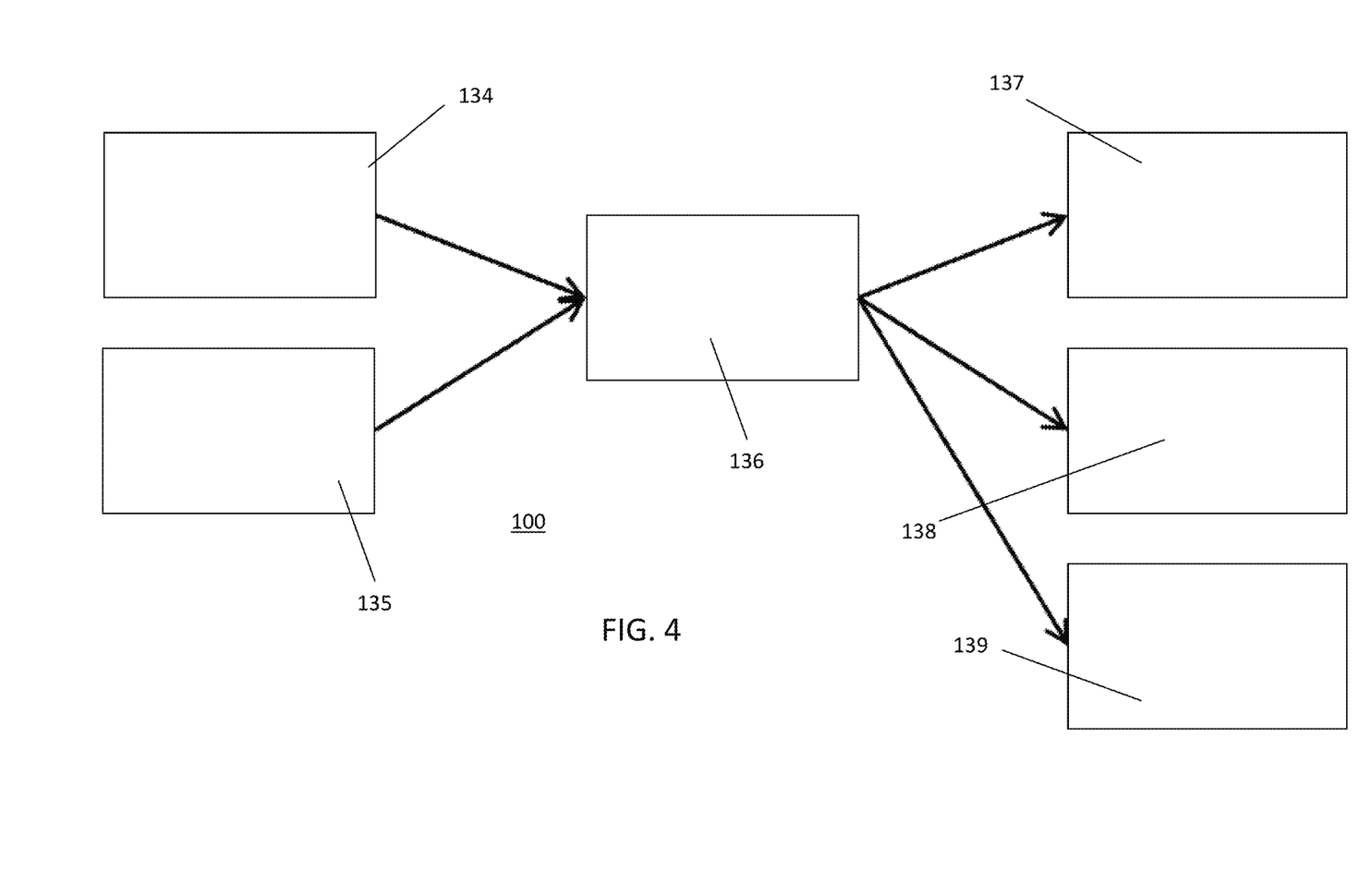
FIG. 4 illustrates a block diagram of a light control system for a drilling rig system according to one or more embodiments of the present disclosure.

Now referring to FIG. 4, in one or more embodiments, a block diagram of a light control system (LCS) for drilling rig system 100. The LCS may control light pollution of the drilling rig system 100. Additionally, the LCS includes a light monitoring system (LMS) 134 or a rig control system (RCS) 135. The LMS 134 or the RCS 135 includes one or more sensors or measurement device to gather information. The information may include measurements within the drilling rig system 100, such as: personnel location, rig activity (type of work being performed), contributions from surrounding lights (other lights from other parts of the rig), contributions from environmental lighting (sun, moon, stars, horizon, etc.), wind direction and speed, status and/or position of each light on the rig, status and/or position of each light controlling device on the rig (e.g. barriers, spectrum, frequency, etc.). Furthermore, the information may include measurements outside the drilling rig system 100, such as: light brightness of the rig as viewed from the outside, both very close or even miles away; detection of the presence of life-forms in proximity to the rig (life forms that are to be protected from light pollution) by a visual detector, chemical detector, sound detector or any other instrument; wind direction and speed; and satellite imagery or any other meteorological information source.

Still referring to FIG. 4, in one or more embodiments, the LCS includes the usage of an Active Light Control (ALC) system 136 to control light usage based on the information transmitted from the LMS 134 or the RCS 135 to the ALC system 136. Additionally, the ALC system 136 may decide what lights to use on the drilling rig system 100. Based on the information received from the LMS 134 or the RCS 135, the ALC system 136 may optimize the amount of lighting for personnel vision 138. For example, the ALC system 136 may control a light quantity, eliminate sources of glare, eliminate sources of light clutter (too many distracting sources of light can generate confusion and distract from unsafe areas), and maintain darkness on areas that need to be dark (e.g. sleeping quarters). Furthermore, the ALC system 136 may optimize the amount of lighting for safety 139 and minimize the light pollution 137 in various environments. It is further envisioned that the ALC system 136 may use light reflectors (e.g. such as the ones used in traffic signs, bicycles, etc.) instead of controlling the lights in the drilling rig system 100. Further, one skilled in the art will appreciate how the ALC system 136 may decide when to turn off lights instead of relying on light reflectors at particular locations at the drilling rig system 100. As mentioned above, light pollution may include a wide variety of light on the light spectrum. As such, the ALC system 136 may function at a defined light spectrum and vary the light spectrum (e.g. change spectrum on command, and/or automatically) to account for a variety of lights. Additionally, the ALC system 136 may include a battery of lights disposed around drilling rig system 100 with different spectrums, which are then turned on/off depending on the desired spectrum needed. One skilled in the art will appreciate how the ALC system 136 may control what type of light spectrum is most convenient to use at a given time, and the lights on the drilling rig system 100 are adjusted accordingly.

In one or more embodiments, the ALC system 136 may control a light frequency. Lights may either be continuously on (non-blinking) or operated in intermittent fashion (blinking). Intermittent fashion may be a fully on/off cycles that the frequency of these cycles may vary from being detected by the human eye or being beyond detection by the human eye. Additionally, the intermittent fashion may include intensity cycles that are oscillated with varying intensity but without fully being turned off. It is further envisioned that intermittent fashion may be the combination of fully on/off cycles and intensity cycles. According to the present disclose, in one or more embodiments, ALC system 136 may control what type light frequency it is most convenient to use at a given time, and the lights on the drilling rig system 100 are adjusted accordingly. Furthermore, it is further envisioned that lights fixtures of the drilling system 100 may have devices that allow the light only to project at a target direction (e.g. the reflective shells behind car lights, flashlights, etc.) to create a forced illumination. The focused illumination prevents light from escaping into directions where it is not useful or wanted. The ALC system 136 may control the forced illuminate for variable focusing, which is the ability to widen or narrowing a focus area of the forced illuminate automatically or on command. Further, the ALC system 136 may control what type of focus angle is convenient to use at a given time, and the lights on the drilling rig system 136 are adjusted accordingly. It is further envisioned that the ALC system 136 may be used to control active noise cancellation (ANC) and active vibration cancellation (AVC) devices.

Figure 5A:
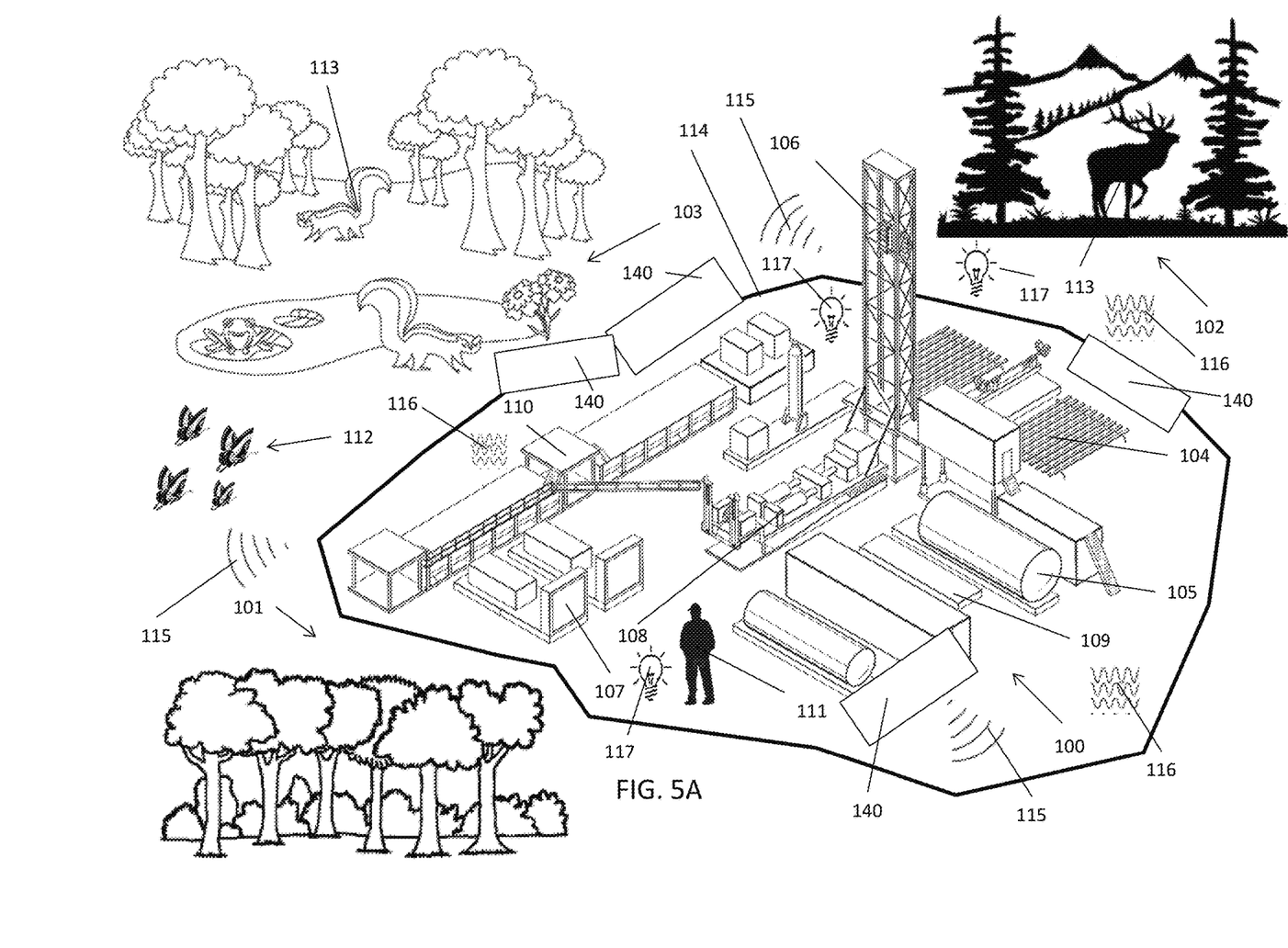
FIGS. 5A-5B illustrate a view of barriers for a drilling rig system according to one or more embodiments of the present disclosure.
Figure 5B:
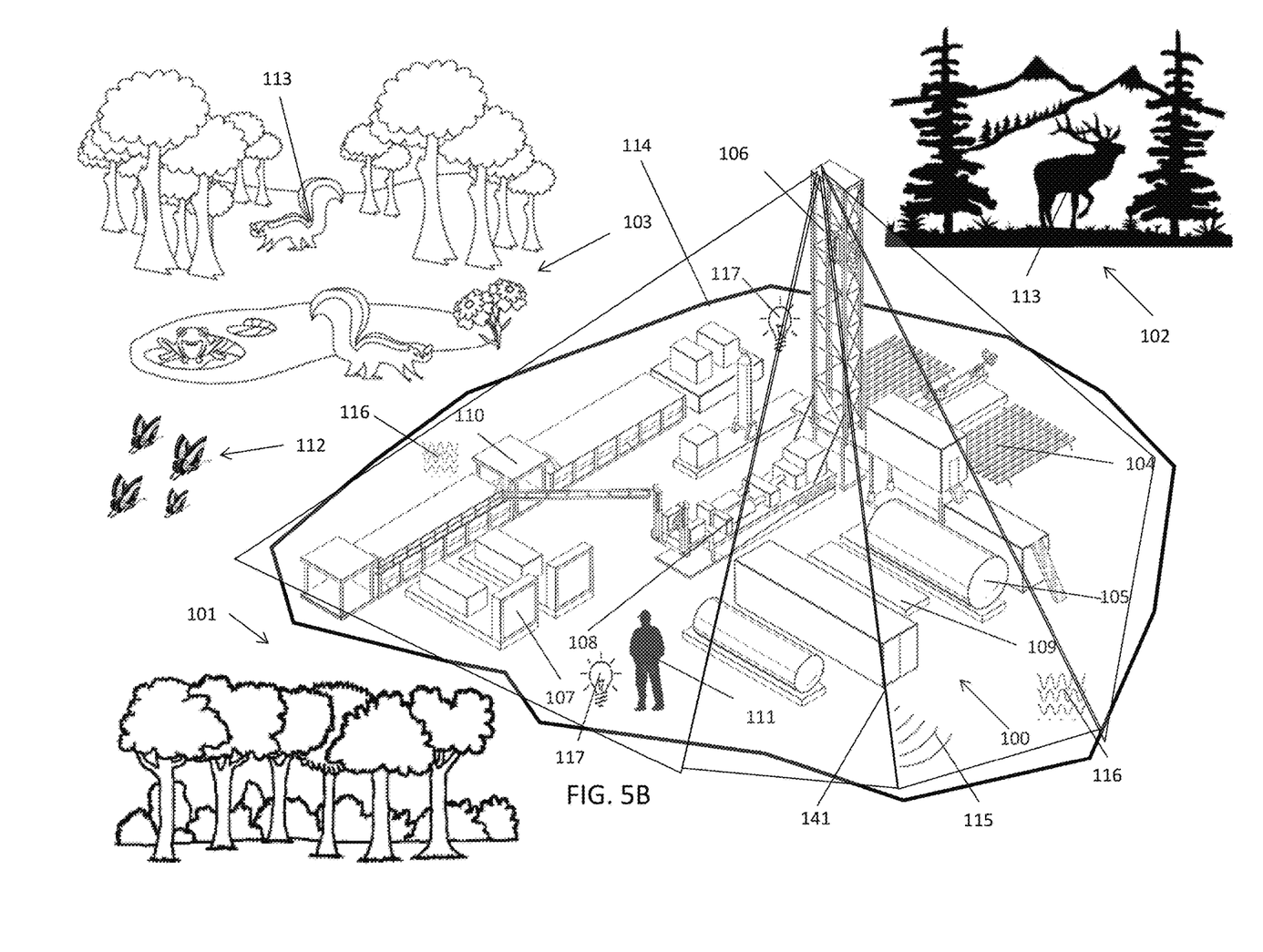

Now referring to FIGS. 5A-5B, in one or more embodiments, at least one or more barriers 140, 141 may be deployed on the drilling rig system 100 is shown. The drill rig system 100 may be near a forest 101, mountain rages 102, water sources 103, or any environment. Additionally, the drilling rig system 100 includes a wide variety of rig equipment, which generates a form of pollution, such as noise 115 and vibration 116. Furthermore, the drilling rig system 100 may generate light 117. The wide variety of rig equipment may include tubulars 104, tanks 105, a rig derrick 106, mud pumps 107, well equipment 108, tool skids 109, mud skids 110, or any piece of equipment know in the art used at drilling rig systems 100. Additionally, the drilling rig system 100 may include a boundary 114 to separate the drilling rig system 100 from the various environments (e.g. forest 101, mountain rages 102, water sources 103, etc.). The boundary 114 may be an invisible boundary or a physical boundary. As mentioned above, the noises 115, vibrations 116, or lights 117 may have effects on humans 111, wildlife 113 and insects 112, as well as the environments 101, 102, 103. As such, in one or more embodiments, the drilling rig system 100 may use barriers 140 to control noises 115, vibrations 116, or lights 117 from escaping specific areas on the drilling rig system 100, from escaping the drilling rig system 100 altogether or to re-direct the noises 115, vibrations 116, or lights 117. It is further envisioned that the barriers 140, 141 may be walls, curtains, insulated material, or any other barrier can be used for containment. For example, the barriers 140 may also have the following characteristics: rigid, flexible, solid, hollow, inflatable, permeable, impermeable, opaque, transparent, partially transparent, reflective, block light completely, filter, dampen and/or redirect sound and/or vibration, plain, patterned or designed such as they mimic their surroundings (e.g. camouflage). Additionally, one skilled in the art will appreciate how drilling rig system 100 may use any number of barriers 140, 141 that are needed to achieve the desired level of noises 115, vibrations 116, or lights 117. Further, as shown by FIG. 5B, the barrier 141 may completely enclose the drilling rig system 100.

In one or more embodiments, the barriers 140, 141 may include openings (not shown) to allow for entrances for personnel and/or equipment, if desired. Additionally, the barriers 140, 141 may be made of material or built to allow for the exchange of gasses within and outside of the drilling rig system 100. One of skilled in the art will appreciate how the barriers 140 may be at any location the drilling rig system 100 (e.g. inside the boundary 114, at the boundary 114, or outside the boundary 114). It is further envisioned that the barriers 140, 141 may control the noises 115, vibrations 116, or lights 117 in a passive control. The passive control of the barriers 140, 141 may contain, re-direct, and absorb the noises 115, vibrations 116, or lights 117. Furthermore, the barriers 140, 141 may be disposed at pre-established locations on the drilling rig system 100 to be considered static barriers. Alternatively, the barriers 140, 141 may be automatically or manually moved in real time, depending on the measurements taken and controls, to locations on the drilling rig system 100, and then barriers 140, 141 may be considered dynamic barriers.

Many of the aspects described on this disclosure can interact with one another. For example, the barriers may also be used to control noise or the active light control system may also be used to control vibrations. As such, it is understood that many of the strategies described to control one specific pollutant can be used to control another one. Furthermore, the invention includes the usage of a system that controls noise, vibration and light concurrently.

Furthermore, methods of the present disclosure may include use of the walking rig and other structures, such as in FIGS. 1-5B. Because the method may apply to any of the embodiments, reference numbers are not referenced to avoid confusion of the numbering between the different embodiments. Initially, the first step is to determine at least one of light, noise, or vibrations generated from a drilling rig system or rig site. Once the light, noise, or vibrations are identified, a pollution control system modifies an output of the light, noise, or vibrations from the rig site to an environment surrounding the rig site and/or within the rig site. In order to control the noises, an active noise cancellation (ANC) reduces or cancels the noise generated from the rig site. The ANC transmits a second sound wave to cancel or reduce a first sound wave of the noises. Additionally, one or more sound sensors, in and/or outside the rig site, are used for measuring and detecting the first sound wave of the noise. Furthermore, in order to control the vibrations, an active vibration cancellation (AVC) reduces or cancels the vibrations generated from the rig site. The AVC transmits a second vibration wave to cancel or reduce the first vibration wave. Additionally, one or more sound sensors, in and/or outside the rig site, are used for measuring and detecting the first vibration wave. It is further envisioned that the modifying light includes controlling a light from the rig site with at least one active light control (ALC) system. The ALC system receives light data from a light measurement system and/or rig control system to control the light. As such, the ALC system may determine optimal light usage and minimize light pollution is based on the light data gathered from one or more sensors.

In one or more embodiments, the present disclosure may be reflecting the light with at least one light reflector disposed on the rig site. Additionally, controlling the light of rig site includes projecting the light from a light fixture in a target direction with a light focused illumination device disposed on the light fixture. Furthermore, the rig site may include disposing an active pollution control device in close proximity to the light, and/or noise, and/or vibrations, and/or at a boundary of the rig site, and/or outside the boundary of the rig site. It is further envisioned the active pollution control device may be placed below a ground floor level, and/or at a ground floor level, and/or elevated above the ground floor level. Further, one skilled in the art will appreciate how containing the noises, the vibrations, and the light may be done with at least one barrier in and/or outside the rig site.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
   a rig site; and
   at least one pollution control system located on the rig site and configured to modify an output of light, noise, or vibrations from the rig site to an environment surrounding the rig site,
   wherein the at least one pollution control system comprises at least one active light control system configured to control a light from the rig site based on light data received from a light measurement system and/or rig control system.

2. The system of claim 1, wherein the light measurement system and/or rig control system includes one or more sensors configured to gather the light data, wherein the light measurement system and/or rig control system determines optimal light usage and minimize light pollution.

3. The system of claim 1, wherein the rig site comprises at least one light reflector.

4. The system of claim 1, further comprising a light focused illumination device disposed on a light fixture to project the light from the light fixture in a target direction.

5. A method, comprising:
   determining at least one of light, noise, or vibrations generated from a rig site; and
   modifying an output of the light, noise, or vibrations from the rig site to an environment surrounding the rig site and/or within the rig site,
   wherein the modifying comprises controlling a light from the rig site with at least one active light control system, wherein the active light control system receives light data from a light measurement system and/or rig control system to control the light.

6. The method of claim 5, wherein determining optimal light usage and minimizing light pollution is based on the light data gathered from one or more sensors.

7. The method of claim 6, further comprising reflecting the light with at least one light reflector disposed on the rig site.

8. The method of claim 5, wherein controlling the light comprises projecting the light from a light fixture in a target direction with a light focused illumination device disposed on the light fixture.

* * * * *